United States Patent
Byrne et al.

(10) Patent No.: US 9,674,350 B2
(45) Date of Patent: Jun. 6, 2017

(54) TELECOMMUNICATION FRAUD PREVENTION SYSTEM AND METHOD

(71) Applicant: PBXWALL LTD., Dublin (IE)

(72) Inventors: Paul Byrne, Dublin (IE); Emmett McAuley, Dublin (IE)

(73) Assignee: PBXWALL LTD., Dublin (IE)

( * ) Notice: Subject to any disclaimer, the term of this patent is extended or adjusted under 35 U.S.C. 154(b) by 0 days.

(21) Appl. No.: 15/139,249

(22) Filed: Apr. 26, 2016

(65) Prior Publication Data

US 2016/0316049 A1  Oct. 27, 2016

Related U.S. Application Data

(60) Provisional application No. 62/153,451, filed on Apr. 27, 2015.

(51) Int. Cl.

| | | |
|---|---|---|
| H04M 3/00 | (2006.01) | |
| H04M 1/66 | (2006.01) | |
| H04M 3/42 | (2006.01) | |
| H04M 3/22 | (2006.01) | |
| G10L 19/018 | (2013.01) | |

(52) U.S. Cl.
CPC ..... *H04M 3/42314* (2013.01); *H04M 3/2281* (2013.01); *G10L 19/018* (2013.01); *H04M 2203/6027* (2013.01)

(58) Field of Classification Search
CPC ......... H04M 15/47; H04M 2215/0148; H04M 2203/6027; H04M 7/0078; H04M 1/677
USPC ................... 379/188, 189, 32.01, 198, 200
See application file for complete search history.

(56) References Cited

U.S. PATENT DOCUMENTS

| | | | |
|---|---|---|---|
| 5,504,810 A | | 4/1996 | McNair |
| 5,606,604 A | * | 2/1997 | Rosenblatt .......... H04M 3/2281 340/5.74 |
| 5,805,686 A | | 9/1998 | Moller et al. |

(Continued)

FOREIGN PATENT DOCUMENTS

| | | |
|---|---|---|
| WO | 2005025185 A2 | 3/2005 |
| WO | 2010/149373 A1 | 12/2010 |
| WO | 2010149373 A1 | 12/2010 |

OTHER PUBLICATIONS

European Search Report received from EP Application Serial No. 12194191.8 dated Oct. 5, 2013, 4 pages.

(Continued)

*Primary Examiner* — Thjuan K Addy
(74) *Attorney, Agent, or Firm* — Arc IP Law, PC; Joseph J. Mayo

(57) ABSTRACT

Embodiments of the invention include a system and a method for monitoring telephone calls on a plurality of inbound and outbound voice channels made to and originating from a private branch exchange (PBX) network to detect fraudulent activity. Audio data on two or more of the voice channels is monitored and detected. The detection comprises processing binary data streams on at least one inbound voice channel and at least one outbound voice channel, and modifying the bit sequence of the binary data stream of the at least one inbound voice channel by introducing a watermark therein. The streams are compared for determining whether the watermark is present in at least one outbound channel. If the watermark is found, the at least one outbound voice channel is blocked.

15 Claims, 5 Drawing Sheets

(56) References Cited

U.S. PATENT DOCUMENTS

| | | |
|---|---|---|
| 6,763,099 B1 | 7/2004 | Blink |
| 7,826,604 B2 | 11/2010 | Martin |
| 9,008,625 B2 * | 4/2015 | Vendrow .............. G06Q 20/32 455/410 |
| 2004/0234056 A1 | 11/2004 | Heilmann et al. |
| 2012/0099711 A1 | 4/2012 | Tully et al. |

OTHER PUBLICATIONS

"Digital Watermarking", retrieved Dec. 22, 2016 from https://en.wikipedia.org/wiki/digital_watermarking, 7 pages.

* cited by examiner

TELECOMMUNICATION FRAUD PREVENTION SYSTEM AND METHOD

The application claims the benefit of U.S. Provisional Patent Application No. 62/153,451, filed 27 Apr. 2015, the specification of which is hereby incorporated herein by reference.

BACKGROUND OF THE INVENTION

Field of the Invention

At least one embodiment of the invention relates to a method and system for preventing fraudulent use of a telephone system. In particular the invention relates to a fraud prevention system in private branch exchange (PBX) systems.

Description of Related Art

As telephony systems are developed, an increasing number of techniques are used to make fraudulent use of such systems, whether for financial gain or for concealed information exchanges. Known techniques may be as simple as using stolen payment card details to charge calls, and may be as complex as call looping techniques which involve repeatedly calling a private branch exchange (PBX), finding a correct sequence of digits to access an outside line (by trial and error or other hacking techniques) and then placing a costly long distance call through the PBX system. Regardless of the type of fraud, the telecommunications industry is involved in an intensive and ongoing effort to identify different types of fraud and to develop and implement ways of preventing such fraud.

In the above context, PBX fraud, which is colloquially known as "hacking" or "dial through", is increasing both in volume and sophistication. It is known for organised criminals to gain access through PBX systems in order to resell long distance telephone calls at discounted rates, or to generate high volumes of telephone calls to revenue-sharing numbers. Reports from the Irish Garda Bureau of Fraud Investigation indicate that in 2008, Irish firms were dispossessed of up to €75 millions per year through PBX fraud, and the problem has been estimated at up to US$8 billion globally.

Methods and systems for inhibiting fraud are known, which generally consist of identifying a call as likely to be fraudulent, and permitting an appropriate action about relevant, identified calls. For instance, a fraud analyst may rely upon billing detail records (BDRs) and call detail records (CDRs), which contain information pertaining to calls: each BDR and CDR contains an originating number (where the call is from), a terminating number (where the call is to) and a billing number (where the cost of the call is charged to). For example, a call is likely to be fraudulent if it is made using a calling card that has been reported stolen by the owner, and the fraud analyst may thus rely on BDRs to validate call attempts in an effort to identify a fraudulent call, and upon CDRs for responding to fraud when a call has been completed. Such methods are cumbersome and reactive.

Many security improvements have been devised and implemented into PBX systems to try and combat fraud, including solutions capable of alerting an administrator that the PBX has been compromised, wherein the fraudulent use can be stopped as soon as the administrator receives the alert and locks down the PBX. For instance, fraud prevention techniques respectively disclosed in U.S. Pat. No. 5,805,686, U.S. Pat. No. 5,504,810 and US Patent publication US2004234056 detect fraudulent calls by comparing either the originating numbers or the terminating numbers of incoming calls with the originating numbers or the terminating numbers of outgoing calls: if calls have a terminating number of the incoming call being the same as the originating number of the second call, a fraudulent call loop may be in place and the call may be disconnected.

Such techniques remain flawed in some respects. For instance, such systems may not detect a hacker who breaks into a PBX on one line, finds an outside line with a different originating number, and calls another terminating number. Such system also depend upon client-specific configurations and manual intervention at the response stage whereby, if the administrator does not act immediately to a notification, or if a hacker finds a route through the PBX which requires engineering skills to disable the port in use, the fraud will continue until the port is locked down. A further problem with PBX fraud is that it typically occurs over a weekend or at night when there is no administrator available.

A technique improving on the above is disclosed in International Patent publication WO2010/149373, which describes a system for monitoring telephone calls on a plurality of inbound and outbound voice channels made to and originating from a common private branch exchange (PBX) to detect fraudulent activity. A window of audio data samples captured from a first 'red' outbound domain of the PBX is compared against windows of samples captured from all channels on a second 'green' inbound domain of the PBX. If a number of samples are exactly or substantially the same, then the green channel which matches the red channel is considered to be a fraudulent version of the red channel, and is blocked.

This further system advantageously automates the detection and blocking of fraudulent calls within a PBX, relative to earlier systems described above, but still exhibits distinct disadvantages. In particular, the green channel must not have undergone any audio manipulation (such as gain control or transcoding) or the detection fails. Resilience to audio manipulation may be improved by introducing an automatic gain control (AGC) element to the technique. However, with a window size of 4096 samples and a slide of 30 samples, which accommodates a delay of nearly 4 ms at 8 kHz sampling, the WO2010/149373 technique already requires about 40 seconds to detect a fraudulent call, if 30 red channels are compared against 30 green channels, and the addition of an AGC component would lead to a significant rise in detection time, since the computational load imposed by the algorithm rises geometrically as the number of channels to test increases. It can therefore be appreciated that the WO2010/149373 system can only be scaled at a significant computational expense, with sub-optimal time performance.

An improved method of preventing fraud in a private branch exchange of a telecommunications network is therefore required, and a system embodying this method, which mitigate at least the above shortcomings of the prior art.

BRIEF SUMMARY OF THE INVENTION

At least one embodiment of the invention provides an improved approach for handling fraudulent calls occurring within a PBX, as set out in the appended claims, which maintains detection and blocking for signals distorted by audio processing techniques such as gain control, transcoding and more, at significantly less computational expense than the prior art.

According to an aspect of at least one embodiment of the invention, there is therefore provided a system for monitoring telephone calls on a plurality of inbound and outbound voice channels made to and originating from a private branch exchange (PBX) network to detect fraudulent activity, the system comprising means for monitoring and detecting audio data on two or more of the voice channels; wherein the detecting means is configured to process binary data streams on at least one inbound voice channel and at least one outbound voice channel, modify the bit sequence of the binary data stream of the at least one inbound voice channel for introducing a watermark therein, compare the streams and determine whether the watermark is present between the compared at least one inbound channel and at least one outbound channel; and means for blocking the at least one outbound voice channel if the watermark is found therein.

In an embodiment of the method according to the invention, the binary data stream comprises an audio data sample from at least one inbound voice channel and/or at least one outbound voice channel. Preferably, the detecting means is further configured to introduce the watermark at the least significant bit of the sample. The audio data sample may be companded according to A-Law G.711 or μ-Law G.711 and comprises 14 bits.

In an embodiment of the method according to the invention, the detecting means is further configured to introduce the watermark every $n^{th}$ sample of the binary data stream. For instance, for a 64 kbps audio channel, expected to consist of 8000×8 bits received every second, the watermark may be introduced every $8^{th}$ sample.

The watermark is preferably inaudible to the human ear, so as not to alert participants to a fraudulent call in progress.

In an embodiment of the method according to the invention, the detecting means is further configured to process a sliding dot product of the at least one inbound voice channel and the at least one outbound voice channel for determining a correlation thereof. The watermarking technique cannot accommodate signal distortion, and this embodiment advantageously provides a redundant parallel technique for maintaining the monitoring and detecting in such conditions.

In an embodiment of the method according to the invention, the system further comprises means for raising an alert or notification about a fraudulent activity, when the monitoring means matches the same audio data on an inbound and an outbound channel.

According to another aspect of at least one embodiment of the invention, there is also provided a method for monitoring telephone calls on a plurality of inbound and outbound voice channels made to and originating from a common private branch exchange (PBX) to detect fraudulent activity, the method comprising the steps of monitoring and detecting audio data on two or more of the voice channels; wherein the detecting further comprises processing binary data streams on at least one inbound voice channel and at least one outbound voice channel, modifying the bit sequence of the binary data stream of the at least one inbound voice channel for introducing a watermark therein, comparing the streams and determining whether the watermark is present between the compared at least one inbound channel and at least one outbound channel; and blocking the at least one outbound voice channel, if the watermark is found therein.

In an embodiment of the method according to the invention, the step of modifying the bit sequence further comprises injecting the watermark in place of a least significant bit of the sequence. In a variant of this embodiment, the step of injecting is performed for every $n^{th}$ sample of the binary data stream.

In an embodiment of the method according to the invention, each watermark comprises data identifying the at least one inbound channel.

In an embodiment of the method according to the invention, the method may comprise the further step of processing a sliding dot product of the at least one inbound voice channel and the at least one outbound voice channel for determining a correlation thereof.

In an embodiment of the method according to the invention, the method may comprise the further step of raising an alert or notification about a fraudulent activity, when the step of monitoring matches the same audio data on an inbound and an outbound channel.

According to yet another aspect of at least one embodiment of the invention, there is also provided a computer program product which, when processed by a data processing terminal connected to common private branch exchange (PBX), configures the terminal for monitoring telephone calls on a plurality of inbound and outbound voice channels made to and originating from the PBX to detect fraudulent activity, with monitoring and detecting audio data on two or more of the voice channels; wherein the detecting further comprises processing binary data streams on at least one inbound voice channel and at least one outbound voice channel, modifying the bit sequence of the binary data stream of the at least one inbound voice channel for introducing a watermark therein, comparing the streams and determining whether the watermark is present between the compared at least one inbound channel and at least one outbound channel; and blocking the at least one outbound voice channel, if the watermark is found therein.

BRIEF DESCRIPTION OF THE DRAWINGS

For a better understanding of the invention and to show how the same may be carried into effect, there will now be described by way of example only, specific embodiments, methods and processes according to at least one embodiment of the invention with reference to the accompanying drawings in which.

DETAILED DESCRIPTION OF THE DRAWINGS

There will now be described by way of example a specific mode contemplated by the inventors. In the following description numerous specific details are set forth in order to provide a thorough understanding. It will be apparent however, to one skilled in the art, that at least one embodiment of the invention may be practiced without limitation to these specific details. In other instances, well known methods and structures have not been described in detail so as not to unnecessarily obscure the description.

Figure 1:
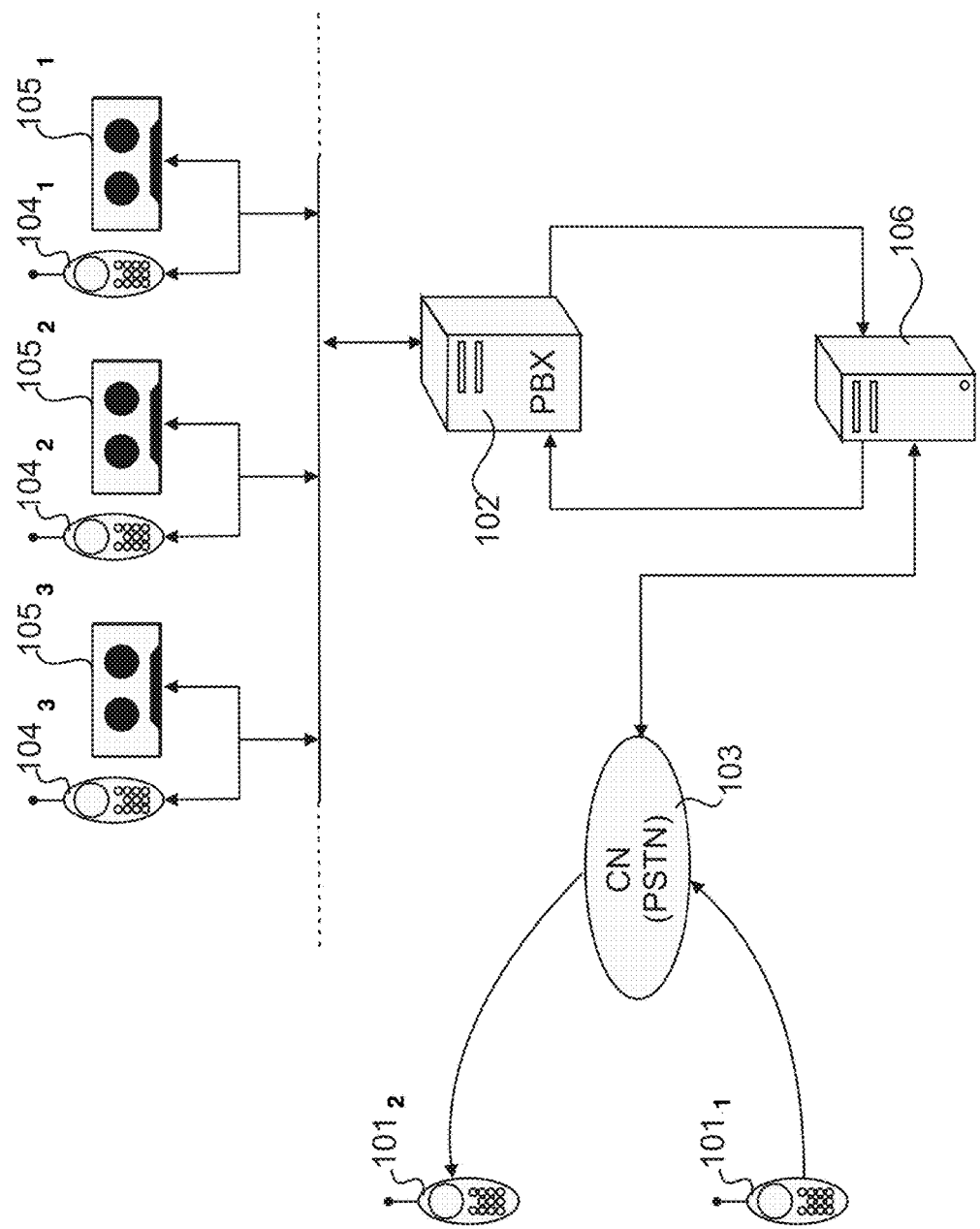
FIG. 1 shows a network environment comprising a communication network in which mobile and static data communication devices are connected to a private branch exchange (PBX), and an embodiment of a system according to the invention.

With reference to FIG. 1, an example embodiment of a system according to the invention is shown within a networked environment, wherein a phone hacker operating a telephone 101 first attempts to gain unauthorised access into a private branch exchange (PBX) 102 via a carrier network (CN) 103. The phone hacker 100 identifies a Direct Dial-In (DDI) number 104 routed through the PBX 102, and at this stage will attempt to utilise one or more functions within the PBX 102 that allow a dial back out of the PBX 102. In the example, the arrows represent the hacker 100 gaining access to a voice mail box 105 of a user extension within the PBX 102, and at this stage the hacker 100 may activate a function allowing a new fraudulent call to be placed.

A fraud prevention system 106 of the invention monitors telephone calls on a plurality of inbound and outbound voice channels made to and originating from a common private branch exchange (PBX) 102 to detect fraudulent activity. The system 106 automatically monitors audio data on voice channels of the PBX 102 and detects whether the same audio data is present on both incoming and outgoing voice channels. If an audio data match is found with an inbound voice channel, the system blocks the outbound voice channel associated with the matched inbound voice channel. The system 106 analyses binary data streams on at least one inbound voice channel and at least one outbound voice channel and the system output can be monitored by an administrator (not shown).

Figure 2:
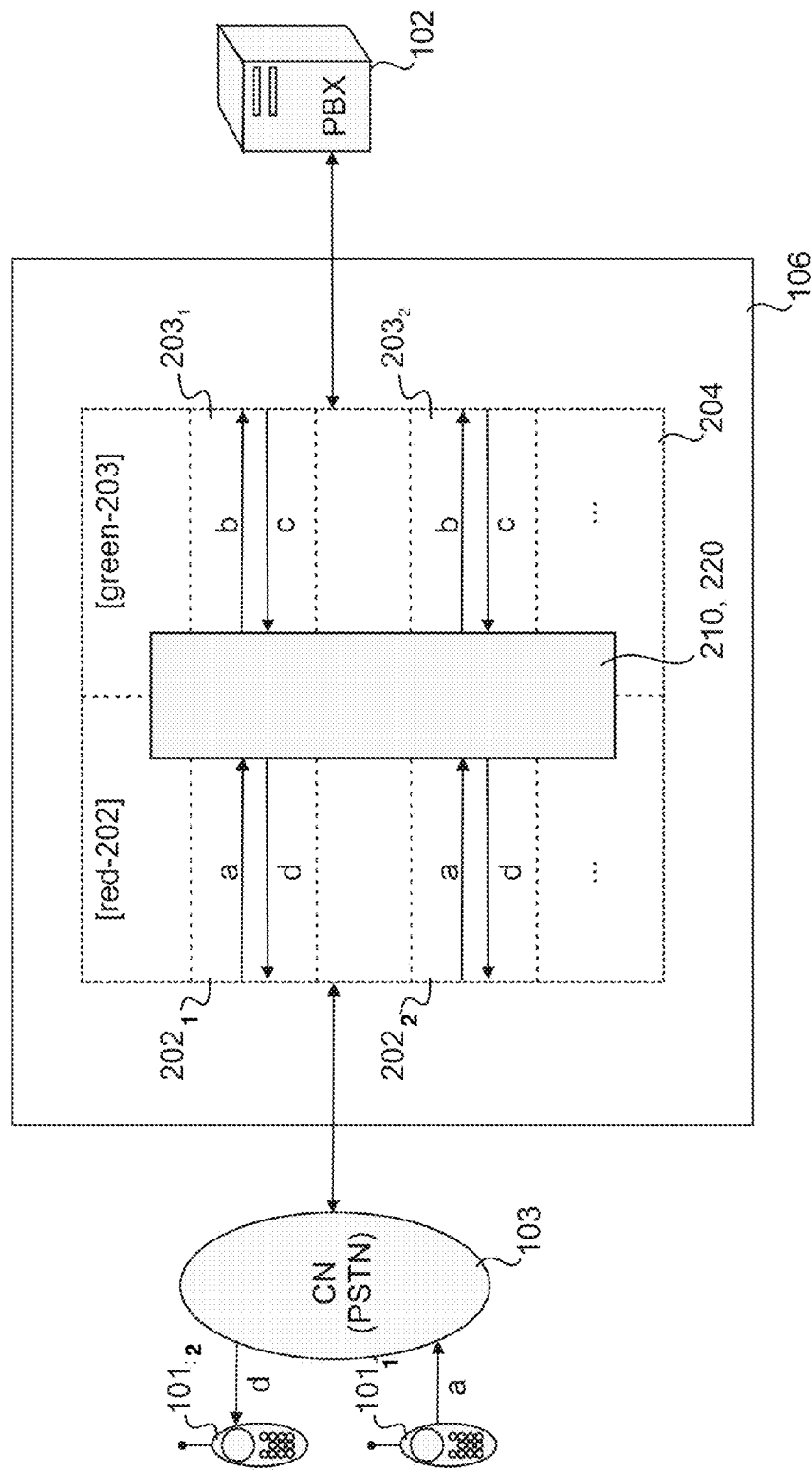
FIG. 2 illustrates call channels in a logic diagram of the private branch exchange (PBX) and the system shown in FIG. 1, including a data processing terminal with memory means.

Referring now to FIG. 2, the technique of at least one embodiment of the invention is now described in more detail for the operation of the system 106. FIG. 2 shows a PSTN 201 connected to a first 'red zone' 202 of the system 106 and a PBX 102 connected to a second 'green zone' 203 of the system 106. The red zone 202 represents inbound calls and the green zone 203 represents outbound calls. The PSTN audio data presentation to the system 106 or the system audio data presentation to the PBX 102 is irrelevant to the techniques of at least one embodiment of the invention, which are only concerned with audio channel processing, thus the environments of FIGS. 1 and 2 and their descriptions are not to be construed as limiting the present disclosure in any way.

Within FIG. 2, an example sequence of a fraudulent call is shown, which follows successive legs "a", "b", "c" and finally "d" and wherein:
- "a" is the PSTN 201 presenting an inbound call
- "b" is the system forwarding the inbound call transparently to the PBX 102
- "c" is the PBX 102 making an outbound call
- "d" is the system forwarding the outbound call transparently to the PSTN 201, after checking numbers respectively stored in a white list (allowed) and a black list (forbidden).

The system 106 monitors the red zone inbound section "a" 202 and the green zone outbound section "c" 203 in operation. The technique of at least one embodiment of the invention is embodied in a data processing application 204 and operates when there is at least one call on leg "a" 202 and at least one call on leg "c" 203, this corresponding to the simplest condition for a fraudulent forwarded call to take place. When this condition is met, a snapshot of audio is taken from each active channel and segregated into red zone channels $202_n$ and green zone channels $203_n$. The system compares every red zone inbound channel "a" $202_n$ against every green zone outbound channel "c" $203_n$ to detect fraudulent calls. If audio data in a red channel $202_n$ is found to match audio data in a green channel $203_n$, then both channels are logged (for example to a database) and disconnected, and a corresponding alarm and/or notice may be automatically raised (for example via email, SMS, SNMP or other). This information can be easily accessed by an administrator, for example as shown in the embodiment of FIG. 3.

Figure 3:
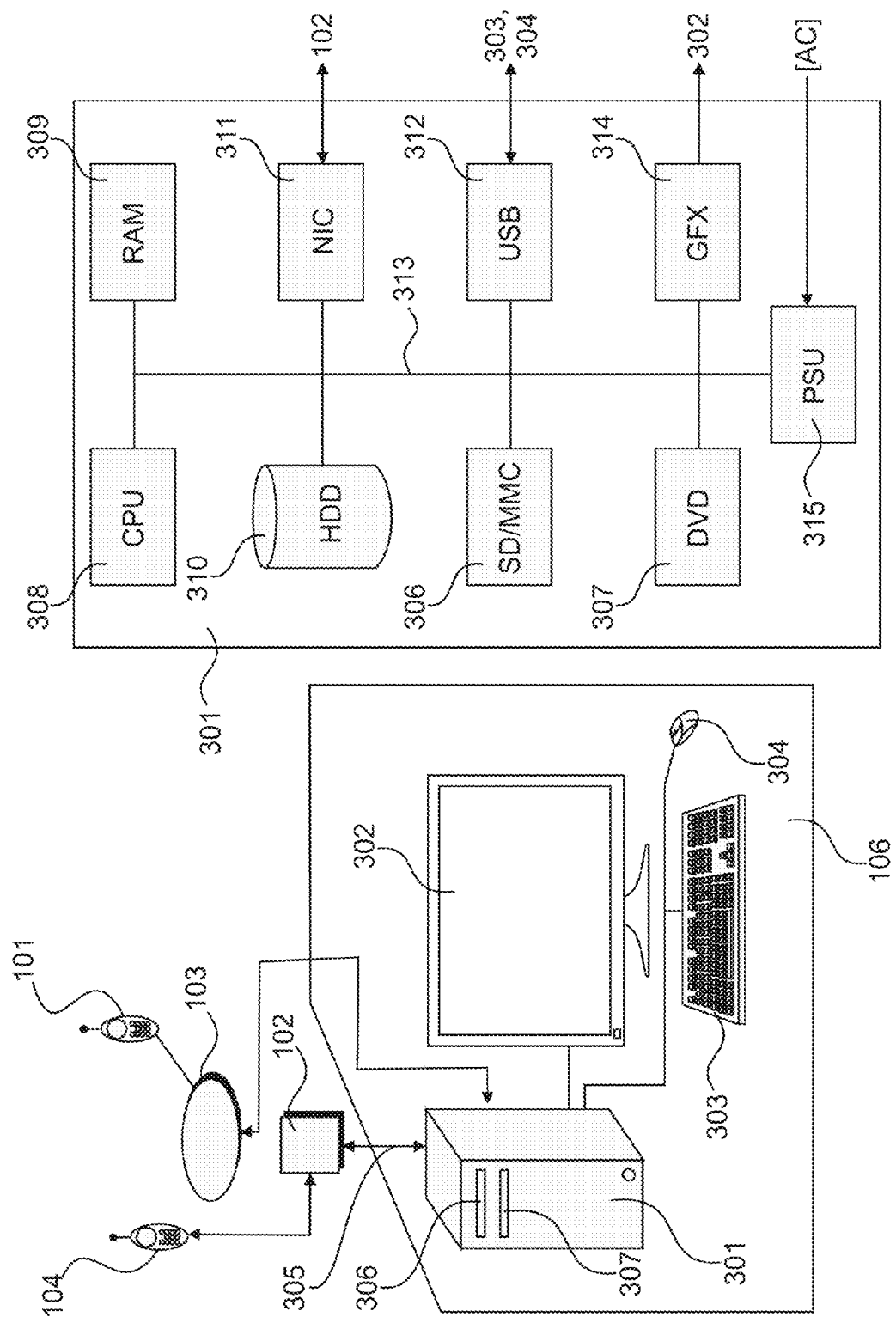
FIG. 3 is a bloc diagram of a typical hardware architecture of the data processing terminal shown in FIG. 2.

A typical hardware architecture of a data processing terminal embodying the system 106 processing the date processing application 204 of FIG. 2 is now shown in FIG. 3 in further detail, by way of non-limitative example. The data processing device 106 is a computer configured with a data processing unit 301, data outputting means such as video display unit (VDU) 302, data inputting means such as HiD devices, commonly a keyboard 303 and a pointing device (mouse) 304, as well as the VDU 302 itself if it is a touch screen display, and data inputting/outputting means such as the wired network connection 305 to the communication network 104 via the router 109, a magnetic data-carrying medium reader/writer 306 and an optical data-carrying medium reader/writer 307.

Within data processing unit 301, a central processing unit (CPU) 308 provides task co-ordination and data processing functionality. Sets of instructions such as the application 204 and data such as sampled audio data for the CPU 308 are stored in memory means 309 and a hard disk storage unit 310 facilitates non-volatile storage for the instructions and the data if required. A network interface card (NIC) 311 provides the interface to the PBX 102. In one embodiment a dual NIC, one for receiving the PRA from the carrier and one for interfacing the PRA on to the PBX can be used. A universal serial bus (USB) input/output interface 312 facilitates connection to the keyboard and pointing devices 303, 304.

All of the above components are connected to a data input/output bus 313, to which the magnetic data-carrying medium reader/writer 306 and optical data-carrying medium reader/writer 307 are also connected. A video adapter 314 receives CPU instructions over the bus 313 for outputting processed data to the VDU 302. All the components of data processing unit 301 are powered by a power supply unit 315, which receives electrical power from a local mains power source and transforms same according to component ratings and requirements.

All audio data both to and from either domain 202, 203 will have been digitized through sampling and is presented to the system 106 as G.711 A-law or µ-law encoded audio. In addition, various distortions, such as fixed & automatic gain control (e.g. imposed by the PBX functionality), delay (from signal routing through devices and networks), transcoding (if several audio codecs are invoked), echo cancellation and/or distortion (from transmission through analogue technologies), may have been applied to the signal during its transition through a domain. Some, or all of the distortions may not occur. Managing delays through detection algorithms can be achieved either by time shifting the input signal, or running an algorithm over a number of time marks. Therefore, an ability to detect a time-shifted version of the green signal with respect to the red signal is required. It is expected that distortions such as gain control, or transcoding may be applied before a fraudulent call is re-routed back to the system 106.

According to the invention, and depending on the embodiment, the system 106 is configured to process the red and green channels with a correlation technique, with a watermarking technique, or with both correlation and watermarking techniques. The signal correlation technique, also known as sliding dot product, has been determined as an optimal method to solve the problem of signal modification(s) as outlined above, in the event that any distortion other than simple delay is applied to the signal. Accordingly, an embodiment of the application 204 comprises a correlator module 210, described hereafter in further detail with reference to FIG. 4.

Figure 5:
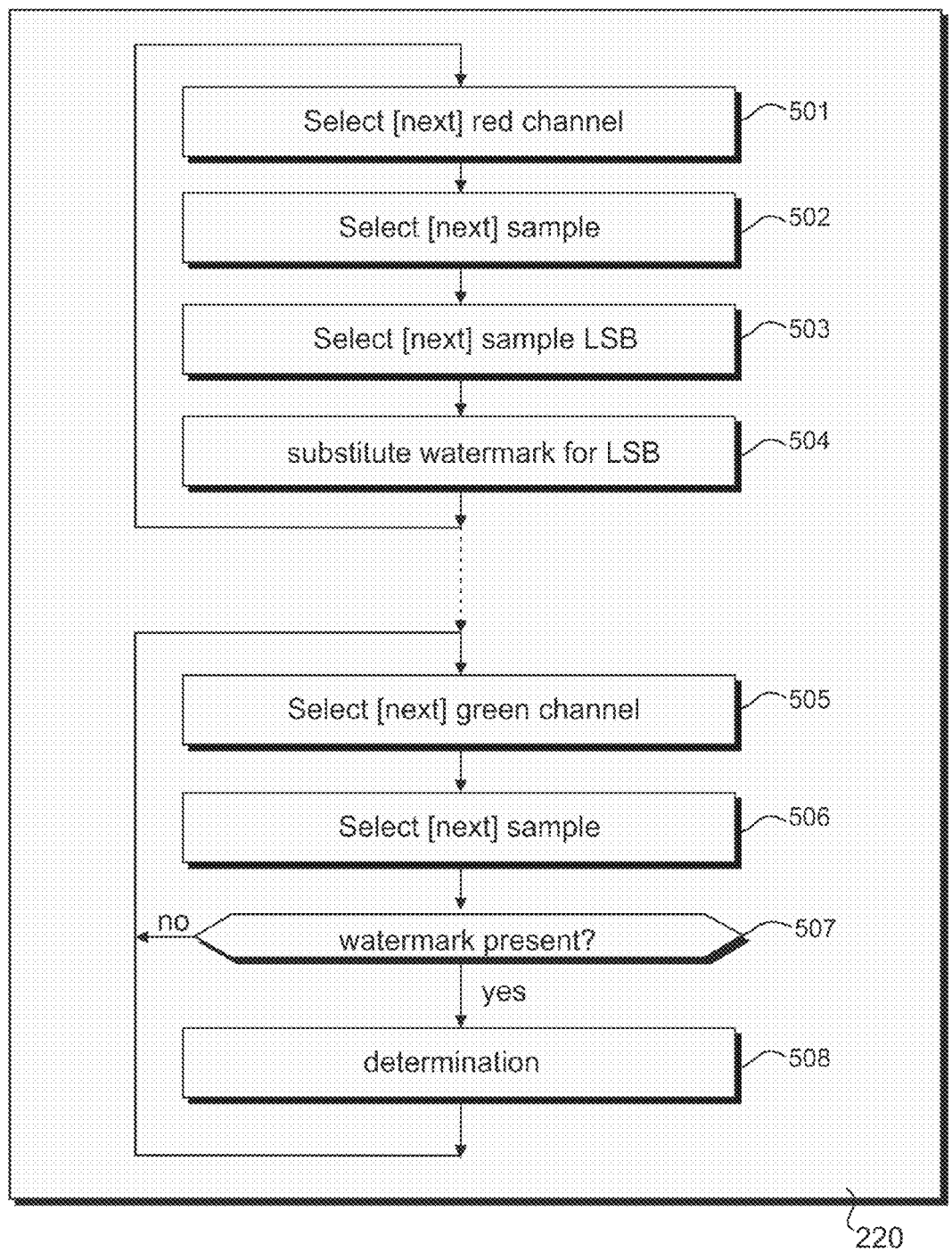
FIG. 5 is a logic diagram of a second embodiment of the fraudulent call detection method performed in the system of FIGS. 1 to 3.

However, it is expected that many of the signals (and possibly all signal in certain circumstances) may contain a significant amount of audio silence, and silent signals are expected to defeat most methods of channel comparison, including the correlation technique. Absolute silence (zero inputs) will lead to dot products of 0, and hence no changes within the bins. The correlation technique therefore does not need to consider silence as a special case, but since silence does not contribute to a possible detection, no detection will ever be possible on a completely silence call. The signal watermarking technique has been determined as an optimal method to solve the problem of silent signals and to improve upon the computational requirements of the correlator technique. Accordingly, another embodiment of the application 204 comprises a watermarking module 220, described hereafter in further detail with reference to FIG. 5.

A further embodiment combining the correlation and watermarking techniques is described hereafter in further detail, which advantageously provides the respective advantages of each technique, but does not exhibit their respective disadvantages, since each technique effectively addresses the shortcomings of the other.

Figure 4:
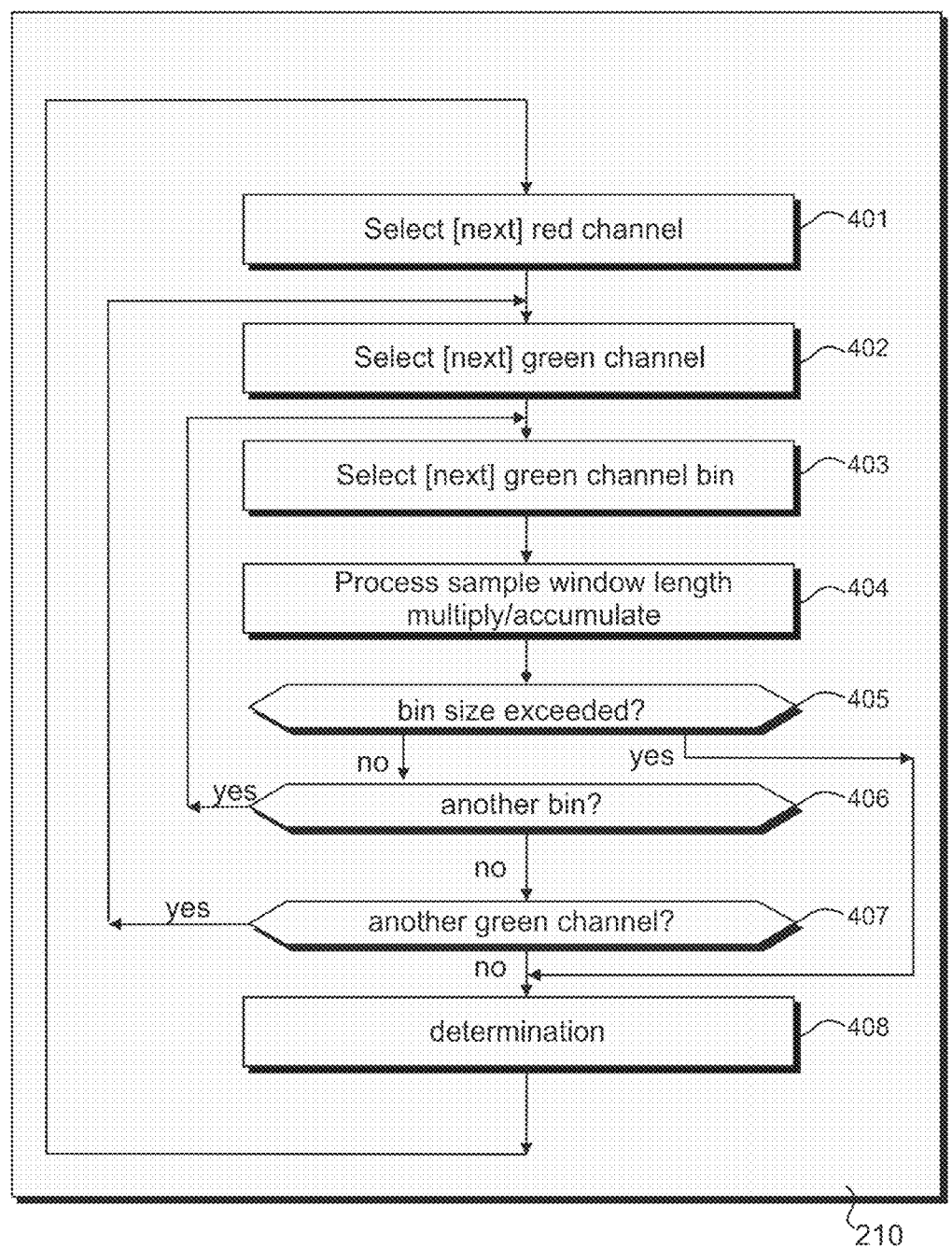
FIG. 4 is a logic diagram of a first embodiment of the fraudulent call detection method performed in the system of FIGS. 1 to 3.

With reference to FIG. 4 therefore, a correlator is a Digital Signal Processing (DSP) technique for determining whether a signal is substantially similar to another signal, and also apt to check whether a signal has time delayed components of itself in auto-correlation. The correlator relies upon bins, and each correlation bin has the sum of the products of a number of samples multiplied together added to it on each iteration. The number of samples that go to make the dot products determines how quickly each bin will grow or shrink, the number of bins determines how much delay can be catered for.

The correlation module 210 performs window length multiply/accumulate operations for each bin of each green channel $203_n$, for each red channel $202_n$. The basic operating principle is that if the samples in the red and green channels have the same sign, then the bin grows, and if not the bin shrinks. The absolute value held within a bin is a measure of how often the red and green samples are moving in the same direction at the same time, scaled by the amplitude of the signals themselves. Each bin represents the correlation of the two signals at a different delay point. As relative movements are considered, rather than absolute values, the application 204 should be resilient against any gain control and transcoding of the signal.

Operations per algorithmic loop (where the number of loops is defined by the overall computational complexity) have a large impact on the potential time it takes to determine if the condition of a fraudulent call has occurred. It must be noted that some conditions are bound by real-time constraints: for example, if 4000 samples need to be present before an operation can start, then ½ s will have elapsed regardless of any computational activity which needs to occur.

Testing of the correlation method was carried out using a pseudo-random noise signal for each channel, wherein the noise signal was copied from a red to green channel to simulate a fraudulent call. The correlation signals were produced in a situation where no modification or distortion was applied to the signal which was correlated. To test the resilience of the correlation technique algorithm to distortions, a further fraudulent signal was created, which was the original input signal transcoded into GSM and then back to linear samples. Direct hex comparison of the respective audio data files indicated that they were completely different at a binary level, but were, as expected, substantially the same signal when reproduced through an audio player.

The correlating algorithm embodied in the correlator module 210 of the test was set to look for turning points, and to flag a correlation if the signal of the largest peak was 6 times the average of the rest of the peaks, and remained in a stable bin for 6 consecutive runs. Testing has showed that, for a pseudo-random signal, which is a perfect signal for correlation, a suitable window length is 32 samples. To cope with delays of up to 4 ms between the red and green channels, 30 bins are required, whereby the computational requirement for each channel is 30*32 (960) operations. Due to the reduced operation count by comparison to the prior art techniques, substantially higher delays than 4 ms can be accommodated whilst retaining the substantially real-time performance level required, so the test was run over a sliding window of 320 samples, corresponding to a 40 ms potential delay.

The nature of speech, particularly long vowel sounds, means that it contains regular sine waves, which will by their nature correlate with themselves. Although there are correlation peaks introduced by the nature of the speech signal itself, it was observed in testing that no single peak was statistically significant. It was also found that false detections could be reduced to very acceptable levels by detecting turning points in the correlation signal, and creating a noise floor only from the peaks of a sine wave.

Testing has showed that significant detection improvements can be made by high-pass filtering the signals before they are applied to the correlator. High pass filtering reduces the number of low frequency signals which obscure the noise floor in the event of non-correlation. Although high-pass filtering remains an option for performance improvement, it is expected to adversely affect the scalability of the technique for accommodating a larger number of channels.

The correlator module 210 is processing the channels to determine corresponding trends between the two signals so should identify them as being the same. The same mathematical operations must be performed regardless of the signals themselves, and it must be noted that the time required to determine a correlated signal will be entirely dependent on the power of the signal itself.

Testing has showed that correlation performed in a single-threaded mode of operation required approximately 2 seconds for identifying a correlating signal when run in noise mode over 120×120 channels. A sliding dot-product correlator thus provides for fast detection when a signal is present, is resilient to most distortions of the audio signal, and its implementation in the application 204 exhibits lower complexity, therefore increased scalability, relative to the sliding window technique of the prior art.

However, the processing requirements for a correlator algorithm embodied in the correlator module 210 are expected to increase geometrically with the number of channels to test and, as previously noted, a silent signal will defeat the purpose of the correlator module 210 of the invention. Accordingly, with reference now to FIG. 5, the watermarking module 220 introduces additional information to the audio signal coming from the red side 202, wherein such additional information is unobtrusive to a participant within the call, i.e. substantially imperceptible to the human hear. All calls entering at the green side 203 are then evaluated against the watermarked red call, to determine whether the watermark data is present in any of them.

Two watermarking techniques have been considered, one of which is deemed applicable to calls with all distortions previously described, and the other of which is only applicable when the digitized data is unmodified except for the potential addition of a delay.

The first watermarking technique consists in adding one or more echo paths to the audio signal. An echo is not deemed to be psycho-acoustically noticeable to a call participant, as long as the delay between the original signal and its echo is kept small, of the order of milliseconds. Indeed, in many situations such a substantially imperceptible echo adds a 'richness' to the sound, which can be pleasing. Conclusively, if the echo delay is less than 1 ms, then usually it is not noticeable by a listener.

The proposed technique involves marking the inbound audio signal with echoes of two different delays, wherein the echo at one delay represents a binary 0 and an echo at the other delay represents a binary 1. A watermarking digital data stream, for instance "this call originated on red channel $202_1$, can then be inserted into the audio channel by toggling between the two echo delays. Recovery of the watermark on the green side 203 is achieved using the autocepstrum DSP technique. The core advantages of this first watermarking technique method are that the indefinite repetition of the watermark result in a system wherein temporal displacement of the return signal does not add to the computational complexity of the system, and that it permits a linear increase in processing requirements as the channel count increases, rather than geometric as in the case of the sliding dot product.

However, the first watermarking technique is not considered as a first implementation choice, because autocepstrum is a technique which both complicated and complex to implement, with operations per loop so high as to prove prohibitive in computational terms. Moreover, this technique relies on there being an acoustic signal to 'echo' as the watermark, but audio silence does not provide such as signal, whereby the technique will be defeated during silent periods.

The second watermarking technique consists in modifying the bit sequence of the audio signal to create a digital data channel in which to introduce the watermark. The inbound audio signal on the red channel is a sampled digital representation of a continuous analogue waveform. As calls are carried through E1 or T1 circuits, samples of 8000×8 bit are expectedly presented with every second, which represents a 64 kbps audio channel. The 8 bit samples will have undergone companding using either A-Law G.711 (Europe) or µ-Law G.711 (US, Japan) and expand to a 14 bit sample. The least significant bit (LSB) of the 14 bit sample lends little to the perceived audio quality, and it is often the case in certain T1 signalling systems that this LSB is 'robbed' to provide a telephony signalling channel.

The second watermarking technique consists in substantially the same approach of 'robbing' the LSB to provide a digital data channel which can be used to carry the watermark. The LSB is replaced with a watermark every $8^{th}$ sample. As the watermark bit may be the same as the bit which is replaced, there is a 50% chance that the sample is actually unaffected. Initial tests with audio data files according to the Windows™ audio file format '.wav' have shown no noticeable degradation of the audio signal.

A data stream is thus injected into the digital audio stream in the form of 'FLAG, length-of-data, data, FLAG', wherein the data portion is formatted as the text 'NKS.XX:YY', in which XX represents the E1/T1 on which the red channel is present, and YY represents the circuit number within that E1/T1. Detection is by bit testing and looking for a FLAG with another FLAG length-of-data octets away. If this condition is met, then the data portion is presented to the application 204 to ensure that it is according to the correct format. There is a theoretical chance that the data sequence will occur naturally within the data stream, therefore the test condition must be met twice to confirm a detection. Alternatively, or additionally, the length of the FLAG can be increased to reduce the likelihood of a false detection. Theoretical detection times are extremely low, because the watermarking data channel runs at 1000 bits/s, and the data length is of the order of 100 bits, therefore double detection will require 200 bits and should require approximately 200 ms.

The time required for detection, assuming that real-time processing can be maintained, is determined by the following formula:

$$\text{Data-rate (Dr) bps} = [\text{samples/bit}]/8000$$

$$\text{Time to detection (Td)} = (\text{bit length of watermark} + \text{samples/bit})/Dr$$

Testing shows that, for 120×120 channels, fraudulent calls could be detected in real time. Testing of the LSB watermarking technique was carried out with 8 samples per bit leading to a Dr of 1000 bps. The watermark data length was 15 octets, or 120 bits. Allowing two hits to validate a detection, theoretical time to detection was 256 ms, or ¼ s. The watermark applied to a speech signal was not audible to the tester.

The time required for detection is a function of the length of the watermark, and the number of LSBs which are 'robbed' to provide the data channel. If audio degradation is determined to be an issue, the rate at which bits are robbed may be reduced, and be balanced against longer detection times. For instance, halving the data rate is expected to result in detection times of the order of ½ s.

As with the first audio watermarking technique described herein, the core advantages of this second LSB watermarking technique method are that the indefinite repetition of the watermark result in a system wherein temporal displacement of the return signal does not add to the computational complexity of the system, which is effectively independent of delay, and that it permits a linear increase in processing requirements as the channel count increases, rather than geometric as in the case of the sliding dot product. Therefore this technique will scale to large numbers of channels with ease, in comparison to geometrically-complex algorithms, such as the correlation technique described herein.

Contrarily to the first audio watermarking technique discussed herein, however, the LSB watermarking technique is computationally inexpensive, as very few operations per processing loop are required to implement it. Moreover, and importantly, the LSB watermarking technique is effective regardless of whether the audio signal is silent or not, since the binary form of a silent audio signal is watermarked in the same manner as an audible audio signal.

Although this second LSB watermarking technique is immune to delays, and a best-fit in terms of computational requirements and the composite character of signals including audible and silent segments, nevertheless it will instantly be defeated by any signal distortions such as previously described, and thus is only effective if there are no modifications of the audio data stream, except for any delay.

Accordingly, an embodiment of the application 204 combines both a correlator module 210 implementing the shifting dot product described herein and a watermarking module 220 implementing the LSB watermarking described herein.

The LSB watermarking module 220 provides the fastest detection regardless of whether the signal is audible or silent, is simple to implement and computationally less expensive than the shifting dot product module 210, and provides scaling linearity for the number of channels monitored. Any distortion of the audio signal which defeats detection attempts by the LSB module 220 is nevertheless accommodated by the shifting dot product module 210, which is resilient to most distortions of the audio signal, and provides still-faster detection, less complexity and hence more scalability than the shifting window technique of the prior art.

It will be appreciated that the invention significantly reduces the risk of PBX fraud. In regard to fraudulent call activity been routed through a PBX, the system provides the ability to detect, block and alert an administrator in real time.

It will be appreciated that the invention does not depend on integration to the PBX or assistance from an administrator to identify and stop a "Hacker".

It will be appreciated that the system 106 of the invention can be implemented as a remote hosted solution such that all calls in a PBX are routed via the remote hosted system, for example over the internet or other communication network.

At least one embodiment of the invention provides a real time solution that bridges the ISDN circuits that are connected to a PBX and by using intelligent monitoring software, such that the system can monitor the DSP resources associated with theses ISDN circuits. If system matches the same voice energy on more than one DSP resource, it will immediately block the relevant B-Channels and alert the administrator that there was an attempt to compromise the PBX.

It will be appreciated that at least one embodiment of the invention operates continually and will automatically continue to detect and block the fraudulent call activity leaving an administrator 7 under no pressure to act immediately to an alert. All detections are immediately notified to the administrator 7, shown in FIG. 1, with an event log stored locally.

It will be appreciated that the system of the invention can be implemented in a firewall type solution that protects PBX systems (telephone systems) from criminals who are focused on hacking into a PBX for the purposes of generating profit by making long distance and premium rate telephone calls across the telephone lines that are connected to the PBX.

It will be appreciated that the system of at least one embodiment of the invention will eliminate the following:
a. Telecom carriers blaming the PBX provider for not protecting the PBX systems sufficiently.
b. Responsibility removed from the PBX providers should the PBX be compromised.
c. Telecom carriers will no longer witness the high levels of unusual calling activity routing through their exchanges.
d. No longer will the Telecommunication carriers enjoy the lucrative turnover and margins associated with PBX Fraud
e. Business community have the option to protect themselves from the significant financial impacts associated with PBX fraud.

In the context of at least one embodiment of the invention the term 'private branch exchange' (PBX) is a telephone exchange that serves a particular business or office or telephone company that can operate for many businesses or for the general public and should be afforded a broad interpretation. PBXs can also be referred to as private automatic branch exchange (PABX) or electronic private automatic branch exchange (EPAX).

The embodiments of the fraud prevention system 106 and the methods described with reference to the drawings comprise a computer apparatus and/or processes performed in a computer apparatus. However, the invention also extends to computer programs, particularly computer programs stored on or in a carrier adapted to bring the fraud prevention system of the invention into practice. The program may be in the form of source code, object code, or a code intermediate source and object code, such as in partially compiled form or in any other form suitable for use in the implementation of the method according to the invention. The carrier may comprise a storage medium such as ROM, e.g. CD ROM, or magnetic recording medium, e.g. a floppy disk or hard disk. The carrier may be an electrical or optical signal which may be transmitted via an electrical or an optical cable or by radio or other means.

While the invention has been described herein with reference to several especially preferred embodiments, these embodiments have been presented by way of example only, and not to limit the scope of the invention. Additional embodiments thereof will be obvious to those skilled in the art having the benefit of this detailed description, especially to meet specific requirements or conditions. Further modifications are also possible in alternative embodiments without departing from the inventive concept.

The invention is not limited to the embodiments hereinbefore described but may be varied in both construction and detail.

The invention claimed is:

1. A system for monitoring telephone calls on a plurality of inbound and outbound voice channels made to and originating from a private branch exchange (PBX) network to detect fraudulent activity, the system comprising:
a monitoring module that monitors audio data on two or more of the voice channels, and a detecting module that detects the audio data on two or more of the voice channels;
wherein the detecting module is configured to:
process binary data streams on at least one inbound voice channel and on at least one outbound voice channel,
modify a bit sequence of the binary data stream of the at least one inbound voice channel and introduce a watermark therein,
compare the binary data streams from the at least one inbound voice channel and the at least one outbound voice channel, and
determine whether the watermark is present between the compared at least one inbound voice channel and at least one outbound voice channel; and,
a blocking module that blocks the at least one outbound voice channel when the watermark is present therein.

2. The system according to claim 1, wherein the binary data streams comprise an audio data sample from one or more of the at least one inbound voice channel and the at least one outbound voice channel.

3. The system according to claim 2, wherein the detecting module is further configured to introduce the watermark at the least significant bit of the audio data sample.

4. The system according to claim 2, wherein the detecting module is further configured to introduce the watermark at the least significant bit of the audio data sample, wherein the audio data sample is companded according to A-Law G.711 or µ-Law G.711 and comprises 14 bits.

5. The system according to claim 2, wherein the detecting module is further configured to introduce the watermark at the least significant bit of the audio data sample and configured to introduce the watermark every $n^{th}$ sample of the binary data stream of the at least one inbound voice channel.

6. The system according to claim 1 wherein the watermark is inaudible to the human ear.

7. The system according to claim 1, wherein the detecting module is further configured to process a sliding dot product of the at least one inbound voice channel and the at least one outbound voice channel to determine a correlation thereof.

8. The system according to claim 1, further comprising a module that raises an alert or notification about a fraudulent activity, when the monitoring module matches a same audio data on the at least one inbound voice channel and the at least one outbound voice channel.

9. A method for monitoring telephone calls on a plurality of inbound and outbound voice channels made to and originating from a common private branch exchange (PBX) to detect fraudulent activity, the method comprising the steps of:
- monitoring and detecting audio data on two or more of the plurality of inbound and outbound voice channels;
- wherein the detecting further comprises
  - processing binary data streams on at least one inbound voice channel and at least one outbound voice channel,
  - modifying a bit sequence of the binary data stream of the at least one inbound voice channel and introducing a watermark therein, and
  - comparing the binary data streams from the at least one inbound voice channel and the at least one outbound voice channel, and
  - determining whether the watermark is present between the compared at least one inbound voice channel and at least one outbound voice channel; and
- blocking the at least one outbound voice channel when the watermark is found therein.

10. The method according to claim 9, wherein the step of modifying the bit sequence further comprises injecting the watermark in place of a least significant bit of the bit sequence.

11. The method according to claim 9, wherein the step of modifying the bit sequence further comprises injecting the watermark in place of a least significant bit of the bit sequence and wherein the step of injecting is performed for every $n^{th}$ sample of the binary data stream of the at least one inbound voice channel.

12. The method according to claim 9, wherein the watermark comprises data identifying the at least one inbound voice channel.

13. The method according to claim 9, further comprising processing a sliding dot product of the at least one inbound voice channel and the at least one outbound voice channel to determine a correlation thereof.

14. The method according to claim 9, further comprising raising an alert or notification about a fraudulent activity, when the step of monitoring matches a same audio data on the at least one inbound voice channel and the at least one outbound voice channel.

15. A computer program product which, when processed by a data processing terminal connected to a private branch exchange (PBX), configures the processing terminal implement a method for monitoring telephone calls on a plurality of inbound and outbound voice channels made to and originating from the private branch exchange (PBX) to detect fraudulent activity, the method comprising the steps of:
- monitoring and detecting audio data on two or more of the plurality of inbound and outbound voice channels;
- wherein the detecting further comprises
  - processing binary data streams on at least one inbound voice channel and at least one outbound voice channel,
  - modifying a bit sequence of the binary data stream of the at least one inbound voice channel and introducing a watermark therein, and
  - comparing the binary data streams from the at least one inbound voice channel and the at least one outbound voice channel, and
  - determining whether the watermark is present between the compared at least one inbound voice channel and at least one outbound voice channel; and
- blocking the at least one outbound voice channel when the watermark is found therein.

* * * * *